(12) United States Patent
Beaujot (10) Patent No.: US 12,410,042 B2
(45) Date of Patent: Sep. 9, 2025

(54) AGRICULTURAL PRODUCT LIFT FOR A TRANSPORT VEHICLE

(71) Applicant: Beaujot Holdings Ltd., Elbow (CA)

(72) Inventor: Norbert Beaujot, Emerald Park (CA)

(73) Assignee: Beaujot Holdings Ltd., Emerald Park (CA)

( * ) Notice: Subject to any disclaimer, the term of this patent is extended or adjusted under 35 U.S.C. 154(b) by 473 days.

(21) Appl. No.: 17/824,622

(22) Filed: May 25, 2022

(65) Prior Publication Data

US 2022/0380150 A1 Dec. 1, 2022

(51) Int. Cl.
  *B66F 7/02* (2006.01)
  *A01C 7/20* (2006.01)
  *B66F 7/28* (2006.01)

(52) U.S. Cl.
  CPC ............... *B66F 7/02* (2013.01); *A01C 7/208* (2013.01); *B66F 7/28* (2013.01)

(58) Field of Classification Search
  CPC ........ B66F 7/02; B60P 1/4492; B60P 1/5423; B60P 1/5457; B60P 1/4421; B60P 1/4435; B60P 1/025
  See application file for complete search history.

(56) References Cited

U.S. PATENT DOCUMENTS

| | | | | |
|---|---|---|---|---|
| 3,051,335 A | * | 8/1962 | Bartlett | B60P 1/4435 414/545 |
| 3,266,646 A | * | 8/1966 | Byrne | B60P 1/4421 293/118 |
| 4,274,789 A | * | 6/1981 | Martin | B60P 1/4421 414/501 |
| 4,313,708 A | * | 2/1982 | Tiliakos | B65D 90/14 414/919 |
| 5,054,989 A | | 10/1991 | Fell | |
| 6,234,740 B1 | * | 5/2001 | Page | B60P 1/02 187/254 |
| 8,998,556 B2 | * | 4/2015 | Learned | B60P 1/6445 414/498 |
| 9,884,577 B2 | * | 2/2018 | Septimio | B60P 1/5423 |
| 2007/0166138 A1 | | 7/2007 | Brooks | |

OTHER PUBLICATIONS

Examination Report form corresponding CA Application No. 3,120,310 mailed Mar. 14, 2024.

* cited by examiner

*Primary Examiner* — Mark C Hageman
(74) *Attorney, Agent, or Firm* — Vorys, Sater, Seymour and Pease LLP (57) ABSTRACT

A pallet raising apparatus for raising a pallet of bags to a desired height adjacent to an air seeder includes a vehicle with a load bed, and a raising stand positioned at a rear end of the load bed. A pallet deck supports the pallet, and the entire pallet is raised and lowered to a convenient height adjacent to an agricultural product applicator. Additional features allow the apparatus to raise large bags of agricultural products as well.

16 Claims, 9 Drawing Sheets

AGRICULTURAL PRODUCT LIFT FOR A TRANSPORT VEHICLE

FIELD OF THE DISCLOSURE

This disclosure relates to the field of lifting equipment and in particular a vehicle for transporting pallets of small bags and large bags to an air seeder at highway speeds, and then lifting them upward to access tanks on the agricultural product applicator.

BACKGROUND

Agricultural seeding products such as seed and inoculants are often purchased in bags. The bags may be relatively small for manual handling, or quite large requiring lifting equipment.

For example 50 pound bags are quite common and typically are purchased on pallets carrying about 60 bags. The entire pallet may be loaded for transport to an agricultural product applicator, such as an air seeder cart, however commonly the bags are manually transferred from the pallet to a transport vehicle. The vehicle then is moved to the air seeder location, and the bags are manually carried up a ladder to a catwalk where the top of the air seeder tank is accessible, and then emptied into the tank. Instead of carrying them up the ladder they are often loaded on a tractor front end loader and raised to the top of the tank. Air seeder manufacturers also provide bag lifts where bags can be manually transferred from the transport vehicle to the lift, which typically carry about 10 to 12 bags, and then raised to a convenient position for depositing into the tank.

Bags of 1000 to 2000 pounds are also commonly used. Air seeder manufacturers offer cranes mounted on the agricultural product applicators to raise these bags from a transport vehicle to an elevated position with the bottom of the bag over the tank where the bag can be emptied. Alternatively front end loaders or the like can be used.

SUMMARY OF THE DISCLOSURE

The present disclosure provides an agricultural bag handling system that overcomes problems in the prior art.

The present invention provides a transport vehicle that can carry one or more full pallets of small bags, and that can lift the entire pallet to a convenient height next to the agricultural product applicator where the only manual operation is to remove and empty as many bags as are required. The pallet is then lowered to the vehicle, which can then be moved at highway speeds to a different location to service another air seeder. Where large bags are used as well, the transport vehicle can again carry one or more bags and position them for emptying into the air seeder tank.

Thus a bag lift is not required on each air seeder, and it is not necessary to drive a separate front end loader to each location where loading is required. When seeding is complete the entire apparatus can be removed from the transport vehicle, leaving the vehicle available for other uses.

In a first embodiment the present disclosure provides a pallet raising apparatus for raising a pallet of bags to a desired height adjacent to an air seeder. The apparatus comprises a vehicle comprising a load bed, and a raising stand positioned at a rear end of the load bed. A pallet deck is configured to support the pallet, and a plurality of primary guides mounted to the pallet deck and to the raising stand are operative to guide the pallet deck up and down the raising stand. A primary winch connected to the raising stand is operative to move the pallet deck up from a lowered location to a raised position on the raising stand.

In a second embodiment the present disclosure provides a raising apparatus for raising bags of agricultural product to a desired height adjacent to an agricultural product applicator. The apparatus comprises a vehicle comprising a load bed. A U-shaped stand is attached to a rear end of the load bed. A front beam is attached at a front end of the front beam to a front portion of the load bed, and slopes upward to a rear end of the front beam that is attached to the top end of the U-shaped stand. A rear beam is movably connected to the front beam such that the rear beam is movable forward and rearward in alignment with the front beam. A boom winch is mounted on a rear portion of the front beam and is operative to roll a beam cable in and out to move the rear beam with respect to the front beam, and a primary winch is attached to a rear end of the rear beam and is operative to roll a primary cable in and out.

In a third embodiment the present disclosure provides a method of loading agricultural products in small bags weighing less than 55 pounds into an agricultural product applicator. The method comprises mounting a raising stand at a rear end of a load bed of a vehicle, and mounting a primary winch to the raising stand; providing first and second pallets filled with the small bags and loading the first and second pallets on the load bed; driving the vehicle to a location of the agricultural product applicator; moving the vehicle in a reverse direction to a loading position adjacent to the agricultural product applicator; connecting the primary winch to the first pallet and raising the first pallet to a desired position adjacent to a catwalk on the agricultural product applicator; manually removing the small bags from the first pallet and emptying the small bags into a tank on the agricultural product applicator; as the level of the small bags on the first pallet lowers as the small bags are removed, raising the first pallet with the primary winch.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
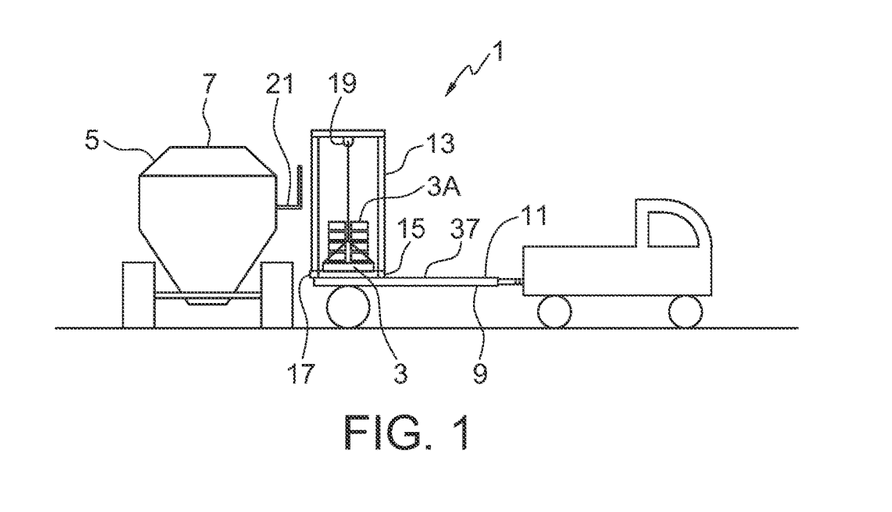
FIG. 1 is a schematic side view of an embodiment of the raising apparatus of the present disclosure for raising a pallet of bags to a desired height adjacent to an agricultural product applicator showing the par in a lowered position.
Figure 2:
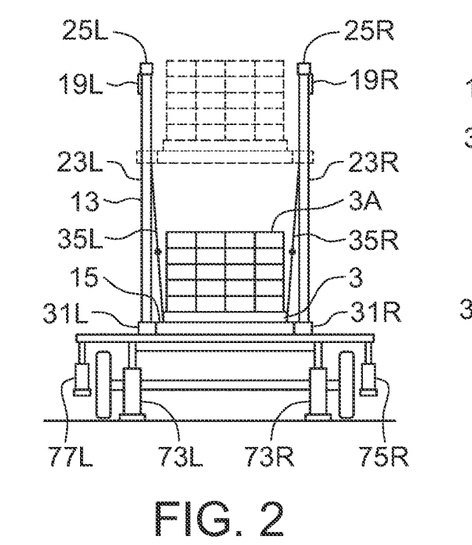
FIG. 2 is a schematic rear view of the embodiment of FIG. 1 showing the pallet of small bags in a lowered position and in a raised loading position.
Figure 3:
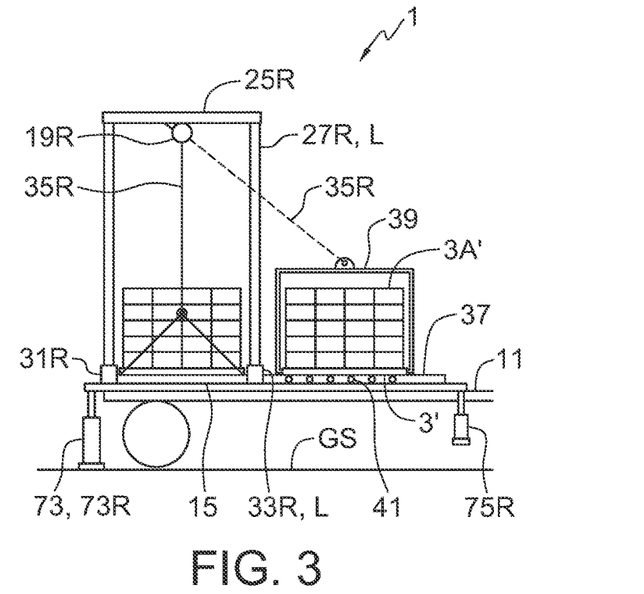
FIG. 3 is a schematic side view of the embodiment of FIG. 1.

FIGS. 1-3 schematically illustrate an embodiment of a pallet raising apparatus 1 of the present disclosure for raising a pallet 3 of bags 3A to a desired height adjacent to an agricultural product applicator 5, such as an air seeder cart, to facilitate loading the bags into the tanks 7 on the cart. The apparatus comprises a vehicle 9 comprising a load bed 11. The vehicle 9 will typically be a truck or a trailer that can be driven at highway speeds for quickly moving from one location to another. A raising stand 13 is positioned at a rear end of the load bed 11 where same can be readily positioned next to an agricultural product applicator 5. A pallet deck 15 is configured to support the pallet, and a plurality of primary guides 17 are mounted to the pallet deck 15 and to the raising stand 13 and operate to guide the pallet deck 15 up and down the raising stand 13. A primary winch 19 is connected to the raising stand 13 and is operative to move the pallet deck 15 up and down the raising stand 13.

The operator uses a forklift or the like to load the pallet 3 onto the pallet deck, transports the vehicle to the agricultural product applicator 5 and then, as schematically illustrated in FIG. 1, an operator is able to back the vehicle 9 up to an agricultural product applicator 5 and raise the pallet deck 15 and pallet 3 to a height where the bags 3A adjacent to the catwalk 21 are at a convenient level for manually moving and emptying into the tank 7. A remote control for the primary winch 19 allows for the operator to adjust the level of the bags 3A higher as the pallet 15 empties. Once the desired amount has been deposited into the tank 7, the pallet deck 15 is lowered, and the vehicle 9 can be moved to service another air seeder. The illustrated load bed 11 also accommodates a second pallet 3' of bags 3A' in front of the raising stand 13. When the first pallet 3 is empty, the pallet 3 can be removed and the second pallet 3' moved onto the pallet deck 15.

The raising stand 13 comprises right and left rear primary columns 23R, 23L extending substantially vertically from a rear end of the load bed 11. The right and left rear primary columns 23R, 23L are separated by a distance greater that a width of the pallet 3. A right primary brace 25R is supported on the rear end by a top of the right rear primary column 23R and extends forward to a front end supported by top end of a right front primary column 27R. A left primary brace 25L is supported on the rear end by a top of the left rear primary column 23L and extends forward to a front end supported by top end of a left front primary column 27L. The right and left front primary columns 27R, 27L are also separated by a distance greater that a width of the pallet 3, and the top of the raising stand 13 is open to allow the bags 3A on the pallet to be raised above the stand 13, and to allow access for an operator.

A right primary winch 19R is mounted on the right primary brace 25R has right primary cables 35R extending down and connected to a right side of the pallet deck 15 and a left primary winch 19L mounted on the left primary brace 25L with left primary cables 35L extending down and connected to a left side of the pallet deck 15.

Right and left rear primary guides 31R, 31L and right and left front primary guides 33R, 33L are mounted to the pallet deck 15 and operate to guide the pallet deck 15 up and down the corresponding right and left rear primary columns 23R, 23L and the right and left front primary columns 27R, 27L. The primary guides at least partially enclose each primary column.

The apparatus 1 includes a storage location 37 on the load bed 11 forward of the stand 13.

The vertical position of the storage location 37 is at substantially the same level as the lowered location of the pallet deck 15. The storage location 37 provides room for a second pallet 3' of bags 3A'. A pallet frame 39 can be attached to the second pallet 3' to facilitate connecting the primary cables 35 to the pallet frame 39 to allow the primary winches 19 to skid the second pallet 3' of bags rearward onto the pallet deck 15. The storage location 39 can also include a plurality of rollers 41 oriented to roll the second pallet 3' rearward onto the pallet deck 15.

Figure 4:
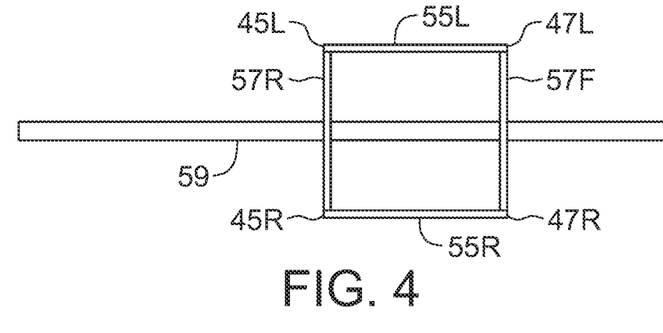
FIG. 4 is a schematic top view of the raising stand.
Figure 5:
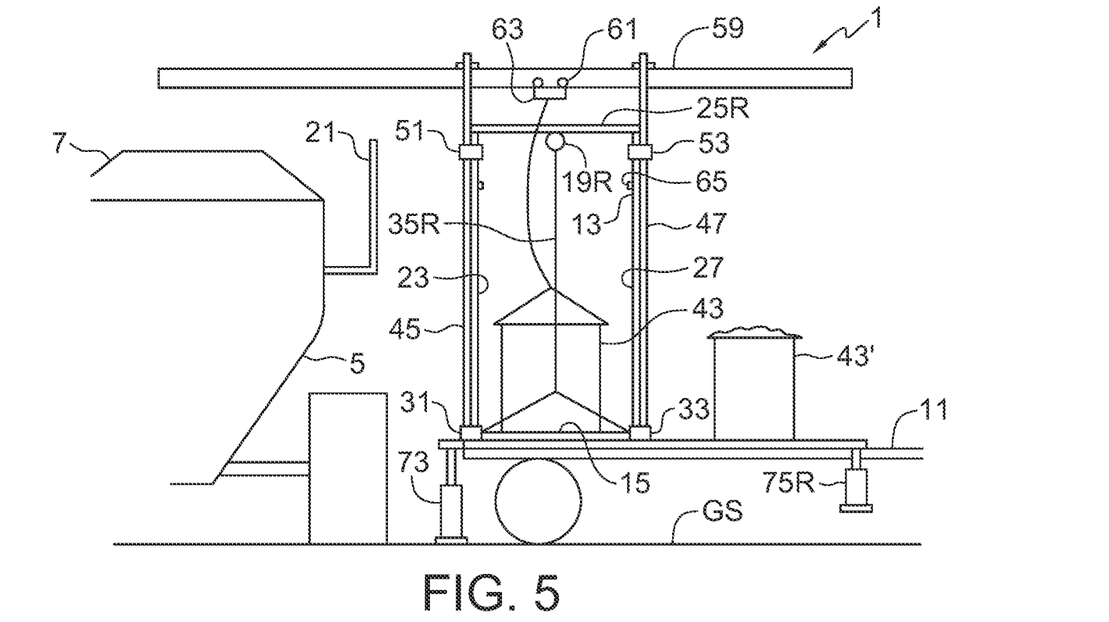
FIG. 5 is a schematic side view of the embodiment of FIG. 1 further fitted with a boom for moving large bags into position over a tank of the agricultural product applicator, illustrated with the boom lowered.
Figure 6:
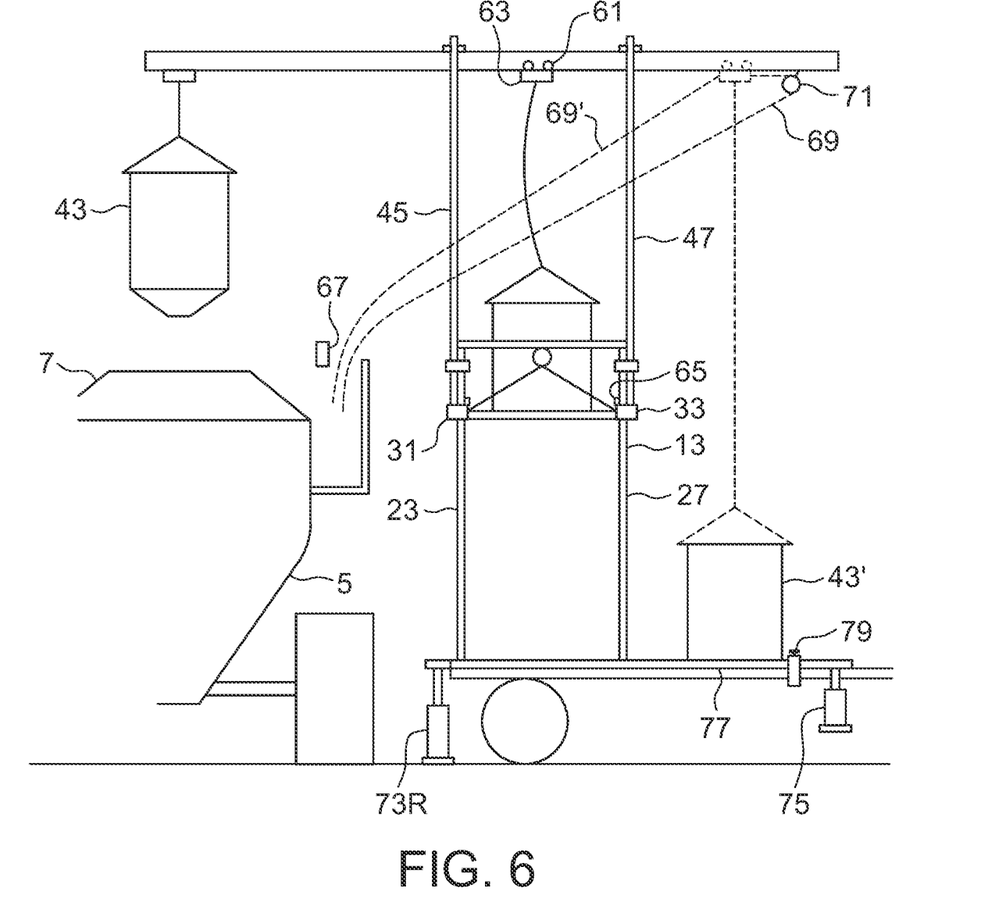
FIG. 6 is a schematic side view of the embodiment of FIG. 5, illustrated with the boom raised and the large bag in an emptying position over the tank of the agricultural product applicator.

The apparatus 1 can also be configured, as shown in FIGS. 4-6, to raise a large bags 43 a vertical distance that is sufficient to maneuver the bottom of the large bag 43 directly over the tanks 7 on the agricultural product applicator 5 to allow the large bags 43 to be emptied directly into the tank.

Rear right and left boom columns 45 extend upward adjacent to the rear right and left primary columns 23R, 23L, and front right and left boom columns 47 extend upward adjacent to the front right and left primary columns 27R, 27L. Right and left rear boom guides 51 and right and left front boom guides 53 are mounted to the corresponding primary columns and operate to guide the boom columns 45, 47 up and down the corresponding primary columns 23, 27. Bottom ends of the rear right and left boom columns 45 and bottom ends of the front right and left boom columns 47 are fixed to the pallet deck 15. The upper guides 51, 53 and lower 31, 33 maintain the boom columns 45, 47 in vertical alignment with the primary columns 23, 27.

A right boom brace 55R is supported on the rear end by a top of the right rear boom column 45R and extends forward to a front end supported by top end of the right front boom column 47R, and a left boom brace 55L is supported on the rear end by a top of the left rear boom column 45L and extends forward to a front end supported by top end of the left front boom column 47L. Front and rear cross braces 57F, 57R are connected to front and rear portions of the right and left boom braces 55R, 55L.

A boom 59 is attached under the center of the front and rear cross braces 57F, 57R and extends rearward from a center of the raising stand 13. The boom 59 is formed by an I-beam and a trolley 61 is operative to move forward and rearward along the boom 59, and a boom winch 63 is attached to the trolley 61.

To raise a large bag 43 resting on the pallet deck 15 the vehicle is backed up to the agricultural product applicator 5 as shown in FIG. 5. The primary winches 19R, 19L are then, for example with a remote control 67, operated to raise the pallet deck 15 and the front and rear boom columns 45, 47 upward until the boom guides 31, 33 meet a stop 65 attached to the primary columns 23, 27 as shown in FIG. 6. The boom winch 63 is then used to raise the large bag 43 to a height where the bottom of the large bag 43 is above the tank 7 and the operator then moves the trolley 61 and bag 43 rearward along the boom 59 to a position above the tank 7, and releases the contents into the tank 7.

In the illustrated embodiment the boom 59 also extends forward of the raising stand 13 over the storage location 37 on the load bed forward of the stand 13. The trolley 61 can be rolled forward along the boom 59, using a rope 69 and pulley 71, to a large bag 43' on the storage location 37 and the boom winch can be lowered to pick up the bag 43' directly and then rolled to a position over the tank 7, using a second rope 69', and emptied.

Figure 5A:
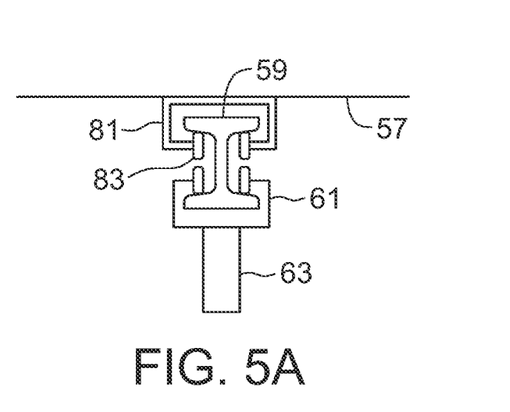
FIG. 5A is a schematic rear view of an alternate boom where the boom itself moves forward and rearward with respect to the boom stand.

The illustrated boom 59 is fixed to the cross members 57F, 57R and extends rearward sufficiently to allow the bag to be emptied into the appropriate agricultural product applicator, and extends forward over the storage location as well. Alternatively FIG. 5A shows an alternate boom arrangement where the boom 59 is mounted to the cross members 57 by a wheel bracket 81 with wheels 83 located under the top flange of the I-beam boom 59. The boom 59 then is movable under the front and rear cross brace 57F, 57Rs such that the boom 59 moves forward to pick a bag 43' from storage, and then the boom 59 rolls rearward on the wheels 83, and the trolley 61 moves rearward on the boom 59 to position the bag over the tank 7.

Figure 7:
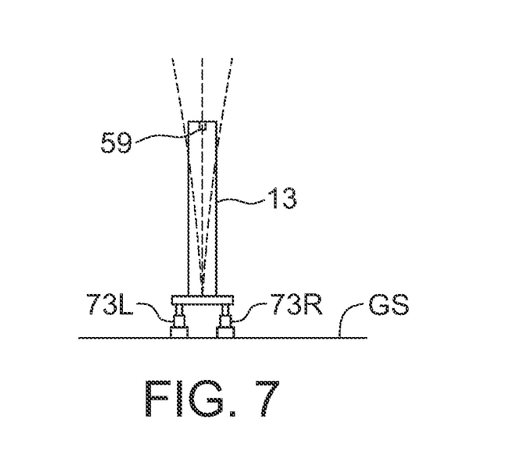
FIG. 7 is a schematic rear view of the embodiment of FIG. 6 showing lateral adjustment.

Right and left rear jacks 73R, 73L are attached to the load bed 11 and are operative to engage a ground surface GS at the rear end of the load bed. In addition to stabilizing the raising stand 13, the right and left jacks 73R, 73L are adjustable to tilt the stand to the right or to the left to correct misalignment of the boom 59, as schematically illustrated in FIG. 7.

The raising stand 13 can also be mounted to a structure 77, such as a full floor or an open arrangement of rails, that is releasably attached to the load bed 11. In the illustrated apparatus the storage location 37 could be located on the structure as well. The rear jacks 73 can be attached to the rear end of the structure 77 and right and left front jacks 75R, 75L can be operative to engage the ground surface GS and a front portion of the structure 77. When the releasable attachment of the structure 77 to the load bed 11, provided by clamps 79 or the like, is released, the front and rear jacks 73, 75 then are operative to raise the structure above the load bed 11 to allow the vehicle 9 to move away from the structure 77. The vehicle 9 can then be used for other purposes.

FIGS. 8-13 schematically illustrate an alternate embodiment of the raising apparatus 101 for raising bags 103A on pallets 103 and large bags 143 of agricultural product to a desired height adjacent to an agricultural product applicator 105. The apparatus 101 comprises a vehicle 109, pictured as trailer and comprising a load bed 111. A U-shaped stand 113 is attached to a rear end of the load bed 111, and a front beam 123 is attached at a front end of the front beam to a front portion of the load bed 111, and slopes upward to a rear end of the front beam 123 that is attached to the top end of the U-shaped stand 113. A rear beam 125 is movably connected to the front beam 123 such that the rear beam 125 is movable forward and rearward in alignment with the front beam 123. A boom winch 129 is mounted on a rear portion of the front beam and is operative to roll a beam cable 131 in and out to move the rear beam 125 with respect to the front beam 125, and a primary winch 133 attached to a rear end of the rear beam 125 and is operative to roll a primary cable 135 in and out.

The U-shaped stand 113 can be fixed to the load bed 111 and have a fixed height. The front beam 123 can then be fixed to the top of the U-shaped stand 113 and to the load bed 111. The slope of the boom comprising the front and rear beams 123, 125 is fixed, and any bag fixed to the end of the rear beam 125 only follows the fixed slope. Where the height of a top end of the U-shaped stand 113 is adjustable further versatility is provided, In FIGS. 8-13 the U-shaped stand 113 is pivotally attached about a substantially horizontal stand pivot axis SPA, oriented substantially perpendicular to an operating travel direction T of the vehicle 109, attached to a rear end of the load bed 111. Since the height of the top end of the U-shaped stand 113 is adjustable, further pivot axes must be provided. The front beam 123 is pivotally attached about a substantially horizontal front beam pivot axis FBPA at a front end of the front beam 123 to a front portion of the load bed 111, and slopes upward to a rear end of the front beam 123 that is pivotally attached about a substantially horizontal rear beam pivot axis RBPA to the top end of the U-shaped stand 113.

Figure 8:
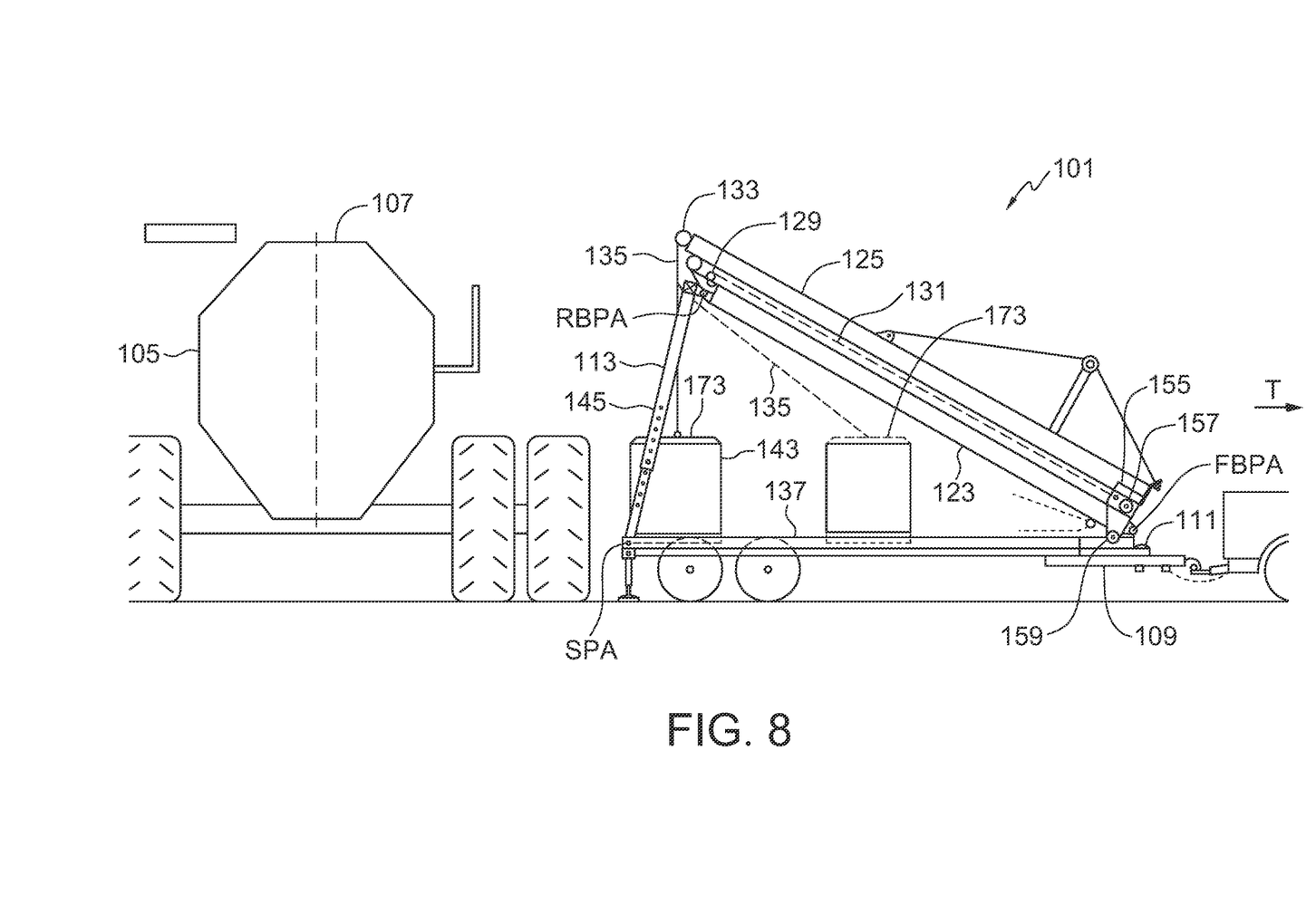
FIG. 8 is a schematic side view of an alternate embodiment of the raising apparatus of the present disclosure for raising a pallet of bags or a large bag to a desired height adjacent to an agricultural product applicator, illustrated in a lowered position.
Figure 9:
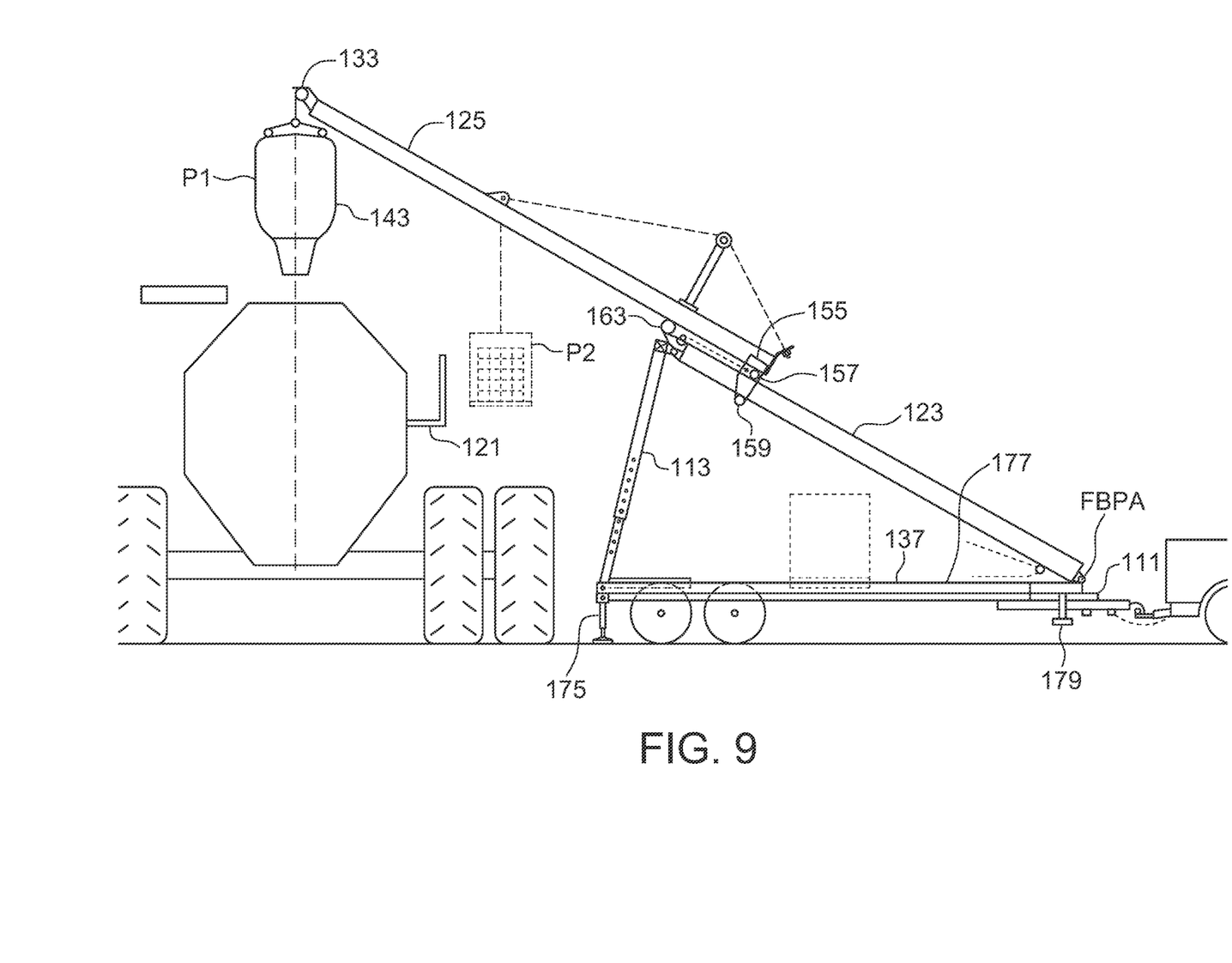
FIG. 9 is a schematic side view of the embodiment of FIG. 8 illustrated in a raised position with a large bag over the tank.

The rear beam 125 may be mounted under the front beam 123, or telescopically extend in and out with respect to the front beam 123, however in the illustrated apparatus 101 the rear beam 125 is movably connected to a top side of the front beam 123 such that the rear beam 125 is movable forward and rearward along the top side of the front beam 123. A boom winch 129 is mounted on a rear portion of the front beam 123 and is operative to roll a beam cable 131 in and out to move the rear beam 125 along the top side of the front beam 123. A primary winch 133 is attached to a rear end of the rear beam 125 and is operative to roll a primary cable 135 in and out.

In operation the vehicle 109 is backed up to a loading position adjacent to the agricultural product applicator 105 and aligned with the appropriate tank 107 as shown in FIG. 8. The primary winch 133 is operated to raise, for example, a large bag 143, and then the boom winch 129 is operated to extend the rear beam 125 rearward to a point where the bottom of the large bag 143 is above the tank 107 in the position P1 of FIG. 9, where its contents can be emptied into the tank. Where a pallet 103 of small bags 103A is raised, the boom winch 129 and primary winch 133 are operated to move the pallet 103 to position P2 of FIG. 9 convenient to an operator on the catwalk 121 for manual loading into the tank 107.

Figure 10:
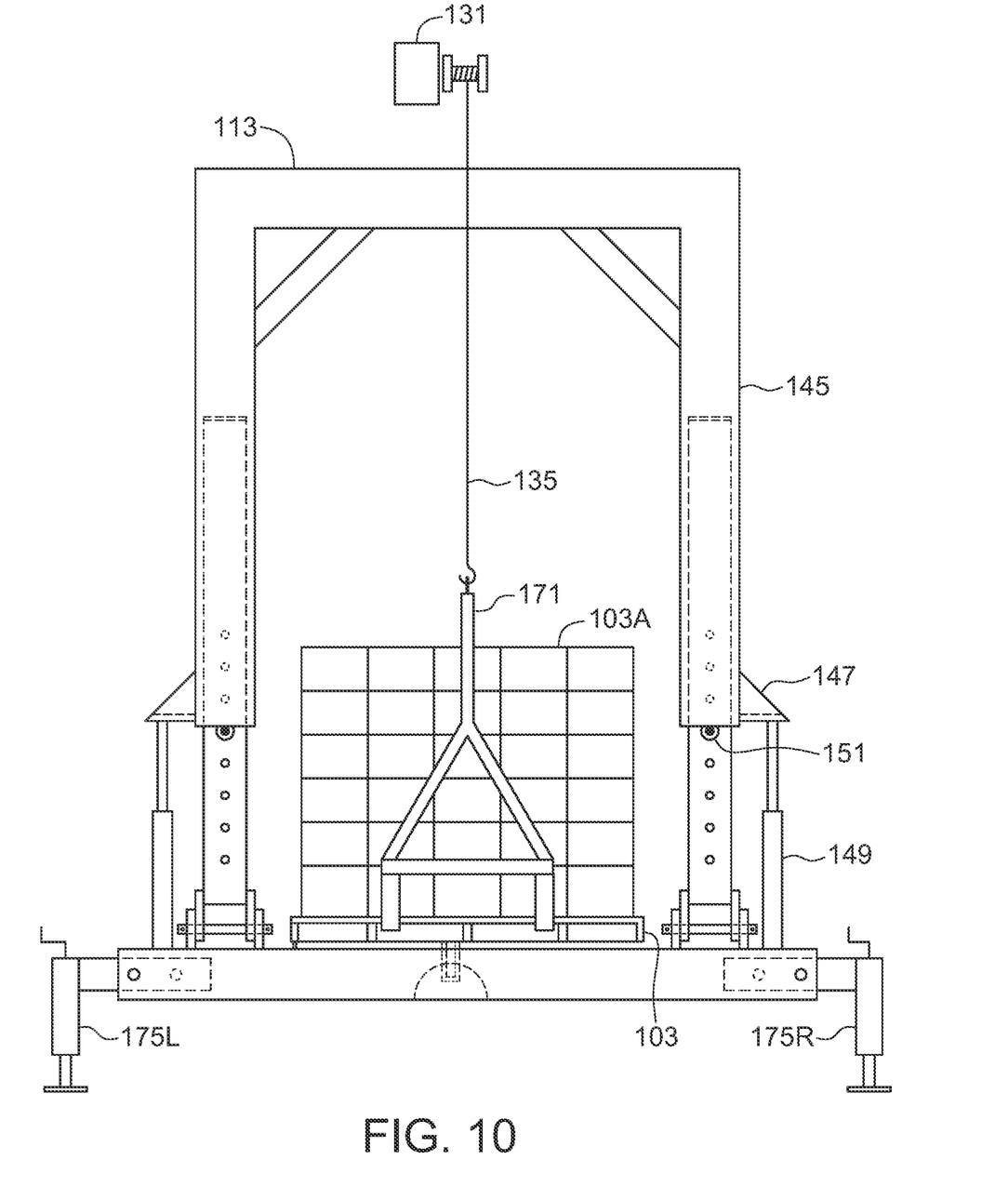
FIG. 10 is a schematic rear view of the embodiment of FIG. 8.

As seen in FIG. 10 the U-shaped stand 113 comprises telescoping legs 145 and the height of the top end of the U-shaped stand 113 is adjusted by moving the telescoping legs 145 to a desired position and securing the telescoping legs. FIG. 10 shows jack brackets 147 attached to the telescoping legs 145 to allow stand jacks 149 to be used to raise and lower the telescoping legs and then secure same with pins 151.

FIG. 10 also shows a first bag frame 171 attached to a pallet 103 of small bags 103A in position to be raised by the primary winch 133 and primary cable 135.

Figure 11:
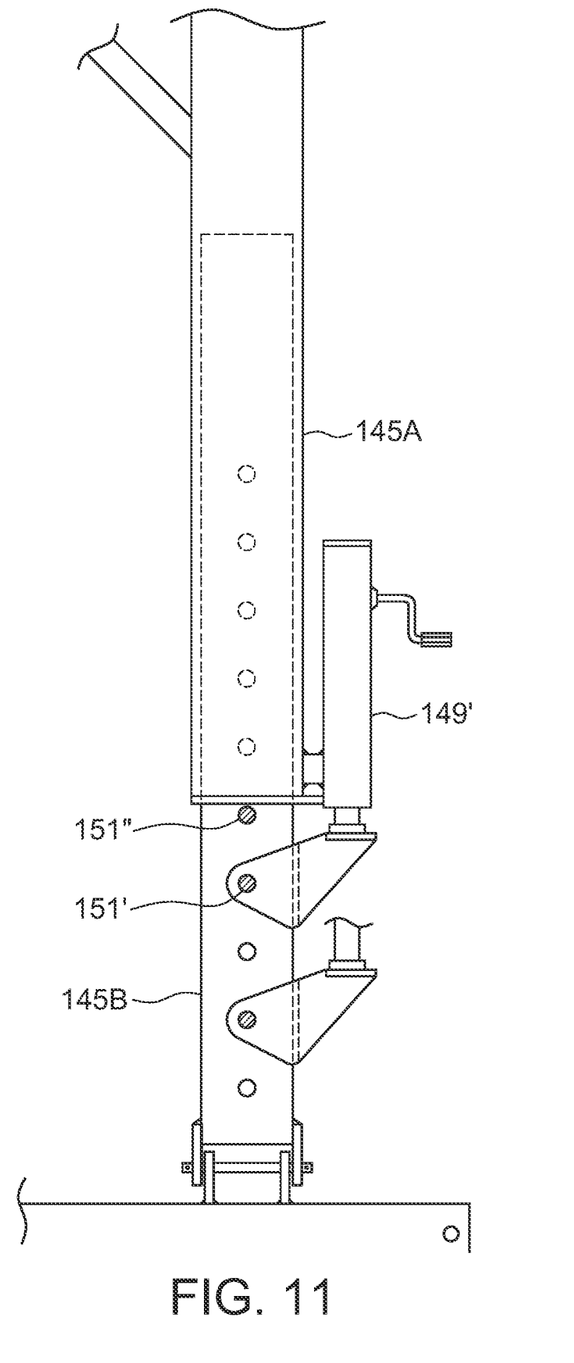
FIG. 11 is a schematic rear view of a jack arrangement for adjusting a height of the U-shaped frame.

FIG. 11 shows an alternate jack arrangement where the stand jacks 149' are fixed to the outer legs 145A and secured by first pins 151' in the inner legs 145B. Once the desired elevation is achieved a second pin 151" is inserted to secure the legs 145A, 145B.

Figure 12:
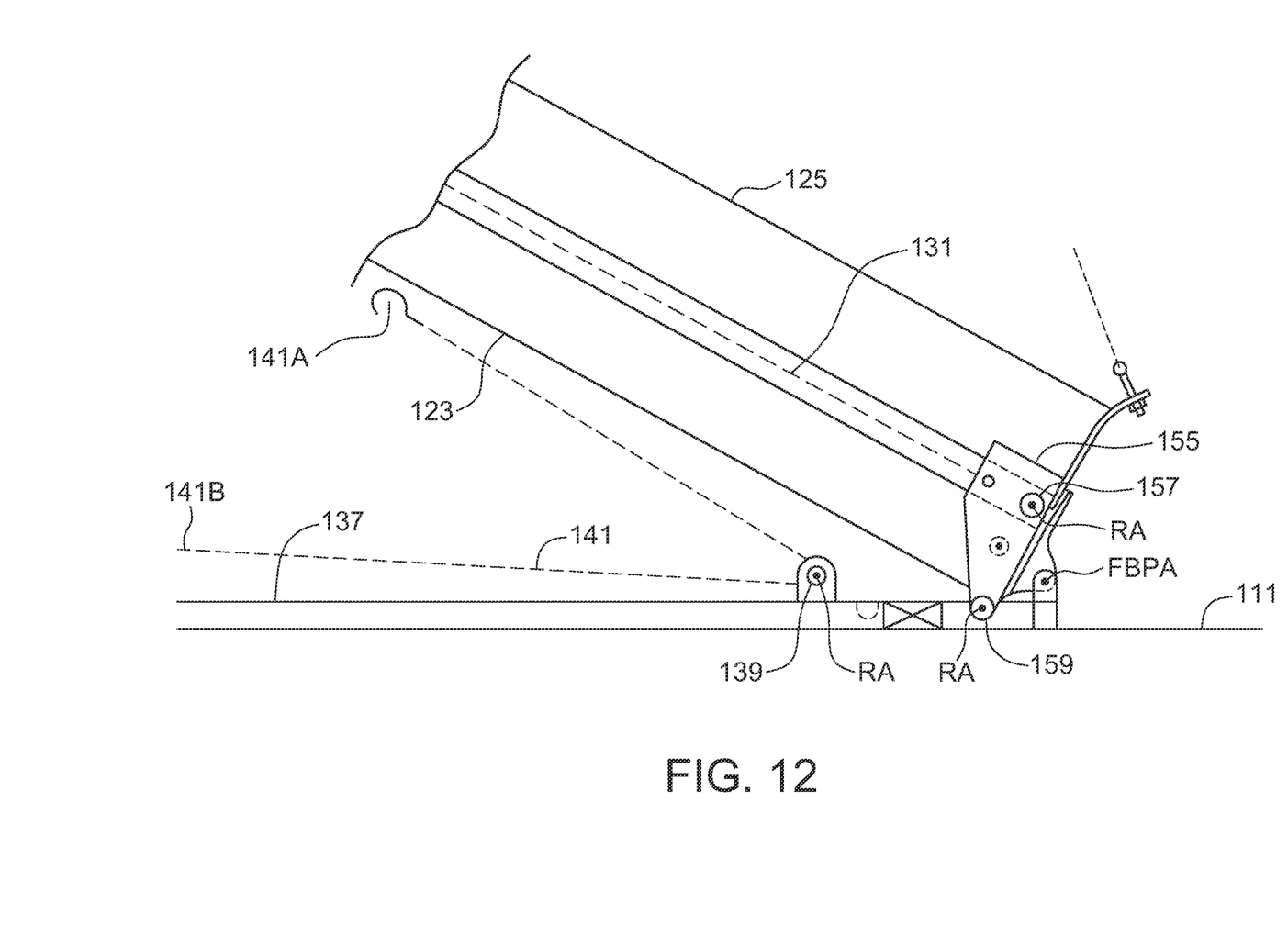
FIG. 12 is a schematic side view showing the front end of the front and rear beams in the lowered position.

FIG. 12 shows the front end of the apparatus 101 and the pivotal attachment of the front end of the front beam 123 to the load bed 111 about the front beam pivot axis FBPA. The front end of the rear beam 125 is attached to a front roller bracket 155 supporting an upper front roller 157 rotating about a substantially horizontal rotational axis RA between the front and rear beams 123, 125, and the front roller bracket 155 further supporting a lower front roller 159 rotating about a substantially horizontal rotational axis RA under the front beam 123.

The beam cable 131 is attached to a front portion of the rear beam 125. In the illustrated apparatus 101 the beam cable 131 extends between the front and rear beams 123, 125 and is attached to the front roller bracket 155.

Figure 13:
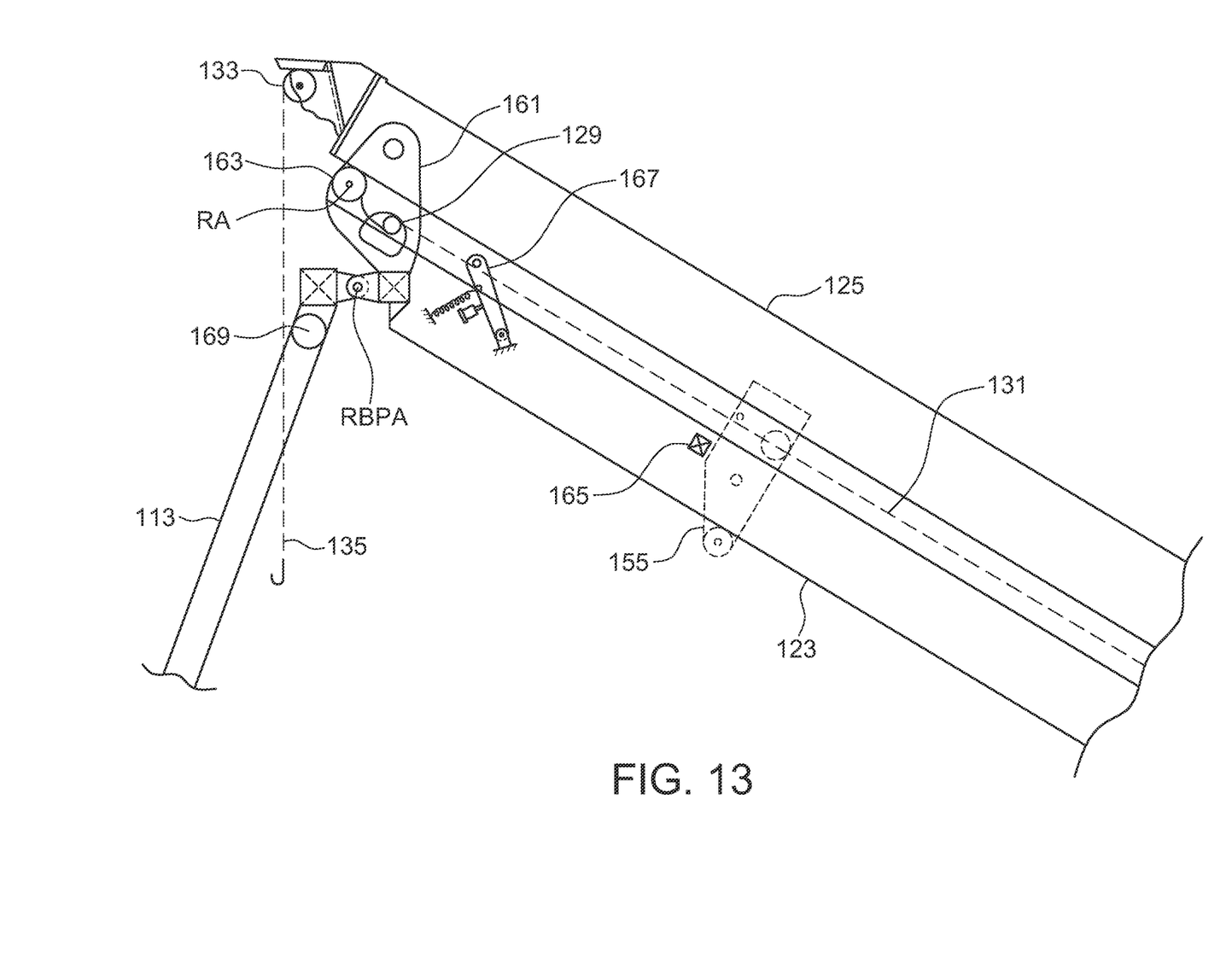
FIG. 13 is a schematic side view showing the rear end of the front and rear beams in the lowered position.

FIG. 13 shows the rear end of the apparatus 101 sloping upward and pivotally attached to the U-shaped stand 113 about the RBPA. A rear roller bracket 161 is attached to a rear portion of the front beam 123 and supports a rear roller 163 rotating about a substantially horizontal rotational axis RA oriented between the front beam 125 and the rear beam 125.

A limit stop 165 extends outward from a rear portion of the front beam 123 to limit the extension of the rear beam 125 as the limit stop 165 bears against the front roller bracket 155 to stop rearward movement of the rear beam 125.

For proper operation of the apparatus 101 the beam cable 131 must always be in tension. If the rear beam 125 fails to move downward along the top of the front beam 123 the beam cable 131 will go slack with no tension and a bump or the like could free the rear beam 125 to fall unrestrained down the front beam 123. To prevent this a slack cable detector 167 is operative to determine when tension on the beam cable 131 is reduced, moving against the slack cable 131, and then is operative to stop the boom winch 129.

A storage location 137 forward of the U-shaped stand 113 can hold a further pallet 103 or large bag 143. To facilitate moving pallets or large bags back and forth along the storage location 137 a storage roller 139 rotates about a substantially horizontal rotational axis RA at a forward portion of the storage location 137 and a storage cable 141 extends around a front of the storage roller 139. An upper end 141A of the storage cable 141 is releasably attachable to the primary winch 133 and a lower end 141B of the storage cable extends rearward to a rear end of the load bed 111. The lower end 141B of the storage cable 141 may also be releasably attachable to the primary cable 135.

When the upper end 141A of the storage cable 141 is releasably attachable to the primary winch 133 by primary cable 135, a pallet 103 may be attached to the lower end 141B of the storage cable at the rear end of the load bed 111 and skidded forward into the storage location 137. A stand roller 169 rotating about a substantially horizontal rotational axis RA under the top of the U-shaped stand facilitates the forward turn of the primary cable 135 under the top of the U-shaped stand 113 required for attachment to skid the pallets forward.

The primary cable 135 is releasably attachable to a first bag frame 171 configured to attach to a pallet 103 of bags 103A as shown in FIG. 10, and also to a second bag fame 173 configured to attach to a single large bag 143 as shown in FIG. 8.

The primary cable 135 is further attachable to the first bag frame 171 on a pallet of bags in the forward storage location 137 and is attachable to the second bag frame 173 in the forward storage location 137, and the primary winch 133 is operative to slide the pallet 103 of bags or the single bag 143 rearward to a position substantially vertically beneath the primary winch 133. The stand roller 169 facilitates this operation as well.

Right and left rear jacks 175R, 175L are attached to the load bed 111 and are adjustable to tilt the stand to the right or to the left as shown in FIG. 7.

The U-shaped stand 113 and the front end of the front beam 123 can be mounted to a structure 177 that is releasably attached to the load bed 111. The rear jacks 175 are attached to a rear end of the structure 177 and front jacks 179 engages a front portion of the structure 177, and the front and rear jacks 175, 179 are operative to raise the structure 177 above the load bed 111 to allow the vehicle 109 to move away from the structure 177. The vehicle 109 can then be put to other uses.

The present disclosure also discloses a method of loading agricultural products in small bags 3A, 103A weighing less than 55 pounds into an agricultural product applicator 5, 105. The method comprises mounting a raising stand 13, 113 at a rear end of a load bed 11, 111 of a vehicle 9, 109, and mounting a primary winch 19, 133 to the raising stand; providing first and second pallets 3, 103 filled with the small bags 3A, 103A and loading the first and second pallets on the load bed 11, 111; driving the vehicle 9, 109 to a location of the agricultural product applicator and moving the vehicle in a reverse direction to a loading position adjacent to the agricultural product applicator 5, 105; connecting the primary winch 19, 133 to the first pallet and raising the first pallet to a desired position adjacent to a catwalk 21, 121 on the agricultural product applicator; manually removing the small bags from the first pallet and emptying the small bags into a tank 7, 107 on the agricultural product applicator; as the level of the small bags on the first pallet 3, 103 lowers as the small bags 3A, 103A are removed, raising the first pallet 3, 103 with the primary winch.

The method further comprises, when the first pallet 3, 103 is empty, lowering the first pallet with the primary winch 19, 133, disconnecting the first pallet from the primary winch and connecting the primary winch to the second pallet 3, 103 and raising the second pallet to the desired position adjacent to the catwalk on the agricultural product applicator.

The method still further comprises a method of loading agricultural products in large bags 43, 143 weighing more than 900 pounds into an agricultural product applicator 5, 105. The method comprises: providing a first and second large bags 43, 143 and loading the first and second large bags on the load bed 11, 111; driving the vehicle 9, 109 to a location of the agricultural product applicator and moving the vehicle in a reverse direction to a loading position adjacent to the agricultural product applicator; connecting the primary winch 19, 133 to the first large bag; providing a boom winch 63, 129 connected to an extendable boom 59, 125; operating the primary winch and the boom winch to extend the boom upward and rearward to a position where the first large bag is above the tank 7, 107 and depositing the agricultural product from the first large bag into the tank.

With disclosed apparatuses all forces are substantially aligned with the center of the vehicle, giving good stability and significantly reducing lateral bending forces. The disclosed apparatuses provides a transport vehicle that can carry one or more full pallets of small bags, and that can lift the entire pallet to a convenient height next to the agricultural product applicator where the only manual operation is to remove and empty as many bags as are required. The pallet is then lowered to the vehicle, which can then be moved at highway speeds to a different location to service another air seeder. Where large bags are used as well, the transport vehicle can again carry one or more bags and position them for emptying into the air seeder tank. The entire apparatus can be removed from the transport vehicle, leaving the vehicle available for other uses.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A pallet raising apparatus for raising a pallet of bags to a desired height adjacent to an agricultural product applicator, the apparatus comprising:
    a vehicle comprising a load bed;
    a raising stand positioned at a rear end of the load bed;
    a pallet deck configured to support the pallet;
    a plurality of primary guides mounted to the pallet deck and to the raising stand and operative to guide the pallet deck up and down the raising stand;
    a primary winch connected to the raising stand and operative to move the pallet deck up from a lowered location to a raised position on the raising stand;
    a boom stand attached to the pallet deck and comprising a plurality of boom columns extending upward from the pallet deck, wherein, when the pallet deck is in the lowered position, the boom stand extends above the raising stand and supports a boom that extends rearward from a center of the raising stand;
    a trolley operative to move forward and rearward along the boom; and
    a boom hoist connected to the trolley.

2. The apparatus of claim 1 wherein the boom further extends forward from the raising stand over a storage location in front of the raising stand.

3. The apparatus of claim 2 wherein the boom is movably mounted on the boom stand such that the boom moves forward and rearward on the boom stand.

4. The apparatus of claim 1 wherein the raising stand comprises:
    right and left rear primary columns extending substantially vertically from a rear end of the load bed, the right and left rear primary columns separated by a distance greater than a width of the pallet;
    a right primary brace supported on the rear end by a top of the right rear primary column and extending forward to a front end supported by top end of a right front primary column;
    a left primary brace supported on the rear end by a top of the left rear primary column and extending forward to a front end supported by top end of a left front primary column.

5. The apparatus of claim 4 wherein the right and left front primary columns are separated by a distance greater than the width of the pallet.

6. The apparatus of claim 4 comprising right and left rear primary guides and right and left front primary guides, each primary guide mounted to the pallet deck and operative to guide the pallet deck up and down the corresponding right and left rear primary columns and the right and left front primary columns.

7. The apparatus of claim 6 wherein the right rear primary guide at least partially encloses the right rear primary column, wherein the left rear primary guide at least partially encloses the left rear primary column, wherein the right front primary guide at least partially encloses the right front primary column, and wherein the left front primary guide at least partially encloses the left front primary column.

8. The apparatus of claim 4 comprising a right primary winch mounted on the right primary brace with right primary cables extending down and connected to a right side of the pallet deck and a left primary winch mounted on the left primary brace with left primary cables extending down and connected to a left side of the pallet deck.

9. The apparatus of claim 4 comprising a storage location on the load bed forward of the raising stand.

10. The apparatus of claim 9 wherein a vertical position of the storage location is at substantially the same level as the lowered location of the pallet deck, and
    wherein the primary winches are operative to move a second pallet of bags located on the storage location rearward onto the pallet deck.

11. The apparatus of claim 9 wherein the storage location comprises a plurality of rollers oriented to roll the second pallet of bags rearward onto the pallet deck.

12. The apparatus of claim 4 comprising:
    rear right and left boom columns extending upward adjacent to the rear right and left primary columns, and front right and left boom columns extending upward adjacent to the front right and left primary columns;
    right and left rear boom guides and right and left front boom guides, each boom guide mounted to the corresponding primary columns and operative to guide the boom columns up and down the corresponding primary columns;
    wherein bottom ends of the rear right and left boom columns and bottom ends of the front right and left boom columns are fixed to the pallet deck;
    a right boom brace supported on the rear end by a top of the right rear boom column and extending forward to a front end supported by top end of the right front boom column;
    a left boom brace supported on the rear end by a top of the left rear boom column and extending forward to a front end supported by top end of the left front boom column;
    front and rear cross braces connected to front and rear portions of the right and left boom braces;
    the boom attached under the front and rear cross braces and extending rearward from the center of the raising stand; and
    a boom winch attached to the trolley.

13. The apparatus of claim 12 wherein the boom extends forward of the raising stand over a storage location on the load bed forward of the raising stand.

14. The apparatus of claim 12 wherein the boom is movably mounted under the front and rear cross braces such that the boom moves forward and rearward on the boom stand.

15. The apparatus of claim 1 comprising right and left rear jacks attached to the load bed and operative to engage a ground surface at the rear end of the load bed, and wherein the right and left rear jacks are adjustable to tilt the raising stand to the right or to the left.

16. The apparatus of claim 15 wherein the raising stand is mounted to a structure releasably attached to the load bed, and wherein the right and left rear jacks are attached to a rear end of the structure and a front jack is operative to engage the ground surface and a front portion of the structure, wherein the front jack and the right and left rear jacks are operative to raise the structure above the load bed to allow the vehicle to move away from the structure.

* * * * *